United States Patent
Cerny et al.

(10) Patent No.: US 11,068,291 B2
(45) Date of Patent: Jul. 20, 2021

(54) SPOOFING CPUID FOR BACKWARDS COMPATIBILITY

(71) Applicant: Sony Interactive Entertainment Inc., Tokyo (JP)

(72) Inventors: Mark Evan Cerny, Burbank, CA (US); Simon Pilgrim, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 824 days.

(21) Appl. No.: 15/411,310

(22) Filed: Jan. 20, 2017

(65) Prior Publication Data
US 2017/0212774 A1 Jul. 27, 2017

Related U.S. Application Data

(60) Provisional application No. 62/286,280, filed on Jan. 22, 2016.

(51) Int. Cl.
G06F 9/50 (2006.01)
G06F 9/455 (2018.01)

(52) U.S. Cl.
CPC ........ G06F 9/45508 (2013.01); G06F 9/5055 (2013.01)

(58) Field of Classification Search
CPC .... G06F 9/45508; G06F 9/5055; G06F 9/541; G06F 9/22
USPC .......................................................... 703/27
See application file for complete search history.

(56) References Cited

U.S. PATENT DOCUMENTS

| | | | | |
|---|---|---|---|---|
| 5,388,215 A | * | 2/1995 | Baker | G06F 13/368 709/229 |
| 5,958,037 A | * | 9/1999 | Dreyer | G06F 9/30003 712/32 |
| 6,691,235 B1 | * | 2/2004 | Garcia | G06F 1/26 323/281 |
| 6,879,266 B1 | * | 4/2005 | Dye | G06F 12/08 341/51 |
| 7,046,245 B2 | | 5/2006 | Cerny et al. | |
| 7,081,893 B2 | | 7/2006 | Cerny | |
| 7,458,078 B2 | * | 11/2008 | DeWitt, Jr. | G06F 11/3636 712/225 |
| 7,786,993 B2 | | 8/2010 | Cerny et al. | |
| 7,802,252 B2 | | 9/2010 | Armstrong et al. | |
| 8,031,192 B2 | | 10/2011 | Cerny | |

(Continued)

FOREIGN PATENT DOCUMENTS

| | | |
|---|---|---|
| JP | 2008171428 A | 7/2008 |
| KR | 100538371 B1 | 12/2005 |

OTHER PUBLICATIONS

Lucille McMinn and Jonathan Butts, "A firmware verification tool for programmable logic controllers", 2012, International Conference on Critical Infrastructure Protection, Springer, Berlin, Heidelberg, pp. 59-69.*

(Continued)

*Primary Examiner* — Juan C Ochoa
(74) *Attorney, Agent, or Firm* — JDI Patent; Joshua Isenberg; Robert Pullman

(57) ABSTRACT

To facilitate backwards compatibility, a computing device may respond to a call from an application for information regarding a processor on the computing device by returning information regarding a different processor than the processor on the computing device.

39 Claims, 3 Drawing Sheets

(56) References Cited

U.S. PATENT DOCUMENTS

| | | | |
|---|---|---|---|
| 8,149,242 B2 | 4/2012 | Langyel et al. | |
| 8,174,527 B2 | 5/2012 | Cerny et al. | |
| 8,949,713 B1 | 2/2015 | Sun et al. | |
| 9,495,790 B2 | 11/2016 | Cerny | |
| 2001/0007574 A1* | 7/2001 | Liu | H04L 5/1446 375/219 |
| 2002/0055828 A1 | 5/2002 | Swoboda et al. | |
| 2002/0112145 A1 | 8/2002 | Bigbee et al. | |
| 2002/0147962 A1 | 10/2002 | Hatanaka | |
| 2003/0112238 A1 | 6/2003 | Cerny et al. | |
| 2003/0112240 A1 | 6/2003 | Cerny | |
| 2006/0001674 A1 | 1/2006 | Cerny et al. | |
| 2007/0002049 A1 | 1/2007 | Cerny | |
| 2008/0092145 A1* | 4/2008 | Sun | G06F 12/1441 719/312 |
| 2008/0168258 A1 | 7/2008 | Armstrong et al. | |
| 2009/0002380 A1 | 1/2009 | Langyel et al. | |
| 2009/0070760 A1 | 3/2009 | Khatri et al. | |
| 2009/0240980 A1 | 9/2009 | Inoue et al. | |
| 2010/0283783 A1 | 11/2010 | Cerny et al. | |
| 2011/0161701 A1* | 6/2011 | Blixt | H03L 1/026 713/320 |
| 2011/0231839 A1* | 9/2011 | Bennett | G06F 9/45558 718/1 |
| 2014/0362081 A1 | 12/2014 | Cerny et al. | |
| 2014/0362100 A1 | 12/2014 | Cerny et al. | |
| 2014/0362101 A1 | 12/2014 | Cerny et al. | |
| 2014/0362102 A1 | 12/2014 | Cerny et al. | |
| 2015/0287158 A1 | 10/2015 | Cerny et al. | |
| 2015/0287166 A1 | 10/2015 | Cerny | |
| 2015/0287167 A1 | 10/2015 | Cerny | |
| 2015/0287230 A1 | 10/2015 | Cerny | |
| 2015/0287232 A1 | 10/2015 | Cerny | |
| 2016/0246323 A1 | 8/2016 | Cerny et al. | |
| 2017/0031732 A1 | 2/2017 | Cerny et al. | |
| 2017/0031834 A1 | 2/2017 | Cerny et al. | |
| 2017/0061671 A1 | 3/2017 | Cerny | |
| 2017/0185412 A1* | 6/2017 | Mishra | G06F 9/30072 |

OTHER PUBLICATIONS

Fischer et al., Pentium III Processor Serial Number Feature and Applications, 1999, Intel Technology Journal Q2, pp. 1-6.*

Dong et al., Extending Xen with Intel Virtualization Technology, Aug. 2006, Intel Technology Journal, vol. 10 Issue 3, p. 193-203.*

"Intel 64 and IA-32 Architectures Software Developer's Manual—vol. 2A—Instruction Set Reference, A-M", Dec. 2009, Order No. 253666-033US, 832 pages.*

Ben Serebrin, "Cross-vendor migration: What do you mean my ISA isn't compatible?", Feb. 2009, CPU Virtualization Architect, AMD, Xen Summit, 4 pages.*

Uwe Dannowski and Andre Przywara, "Cross-vendor migration: What do you mean my ISA isn't compatible?", 2010, 13 pages.*

Extended Europen Search Report dated Jul. 23, 2019 for European Patent Application No. 17741982.7.

Co-Pending U.S. Appl. No. 62/286,280, to Mark Evan Cerny, filed Jan. 22, 2016.

International Search Report and Written Opinion dated Apr. 14, 2017 for International Patent Application PCT/US2017/014262.

Office Action dated Aug. 14, 2019 for Korean Patent Application No. 2018-7024047.

Office Action dated Oct. 1, 2019 for Japanese Patent Application No. 2018-538543.

EPC Rule 94(3) Communication dated Mar. 10, 2020 for European Patent Application No. 17741982.7.

EPC Rule 94(3) Communication dated Apr. 15, 2021 for European Patent Application No. 17741982.7.

* cited by examiner

SPOOFING CPUID FOR BACKWARDS COMPATIBILITY

PRIORITY CLAIM

This application claims the benefit of prior to commonly-assigned, U.S. Provisional application No. 62/286,280, filed Jan. 22, 2016 the entire contents of which are herein incorporated by reference.

BACKGROUND

When a new version of a computer system (a "new device") is released it is desirable for the applications written for a previous version of the system (a "legacy device") to run flawlessly on the new device. This capability is often referred to as "backwards compatibility" with respect to "legacy applications". Even if the new device is capable of executing legacy applications created for the legacy device, the new device may still fail to be backwards compatible when running those applications. Differences in performance of the hardware components of the new device and legacy device can cause errors in synchronization on the new device. Such differences in performance can arise, e.g., from differences in capabilities of the central processing unit (CPU) of the new device relative to the legacy device. For example, if the CPU on the new device is faster than the CPU on the legacy device, data still being used by another component of the new device may be prematurely overwritten by the CPU.

BRIEF DESCRIPTION OF THE DRAWINGS

The teachings of the present disclosure can be readily understood by considering the following detailed description in conjunction with the accompanying drawings, in which.

SUMMARY OF THE INVENTION

The disadvantages associated with the prior art are overcome by aspects of the present disclosure relating to a method in which a computing device responds to a call from an application for information regarding a processor on the computing device by returning information regarding a different processor than the processor on the computing device.

DETAILED DESCRIPTION

Although the following detailed description contains many specific details for the purposes of illustration, anyone of ordinary skill in the art will appreciate that many variations and alterations to the following details are within the scope of the claimed invention. Accordingly, the exemplary embodiments of the invention described below are set forth without any loss of generality to, and without imposing limitations upon, the claimed invention.

Introduction

To address problems resulting from differences in CPU behavior relative to a legacy device, a new device may mimic certain capabilities of the legacy device CPU when running legacy applications. A key feature of the ability to mimic a legacy device is to fool the legacy application into acting as though it is running on a legacy device. Since many applications are designed to be run on different processors, modern processors often implement an opcode or a register that allows a software application to discover details of the processor. To facilitate backwards compatibility, a processor on a new device can execute the opcode or supply the register value in such a way that different processor information is returned in response to a call from a legacy application. The different information is referred to herein as a "Spoofed Processor ID". The spoofed processor ID would selectively identify certain features of the new device as being either different from ones that are actually supported or not being supported at all when in fact they are.

Method

Figure 1:
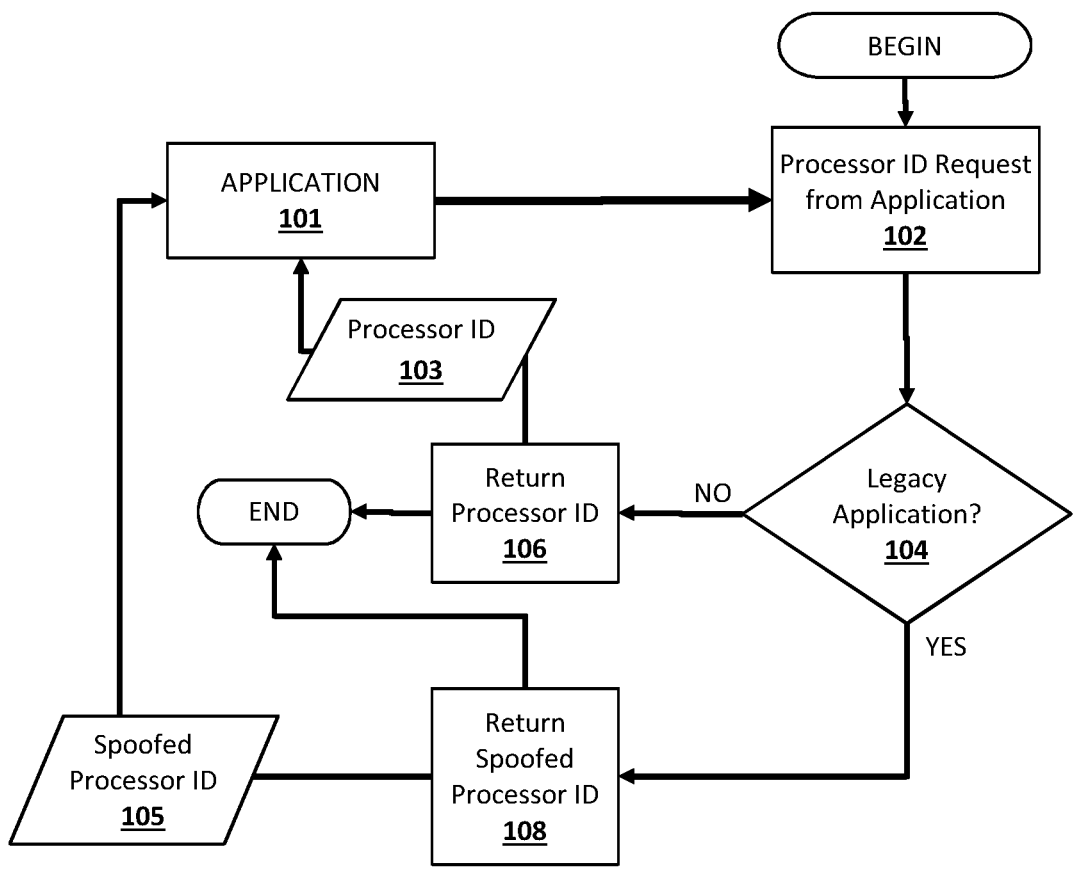
FIG. 1 is a flow diagram illustrating a method for implementing backwards compatibility according to aspects of the present disclosure.

The method 100 depicted in the flow diagram shown in FIG. 1 illustrates an example of how this would work. Specifically, a requesting application 101 running on a device requests a processor ID from the processor running the application, as indicated at 102. The processor determines at 104 whether the requesting application 101 is a legacy application, i.e., one originally written for an earlier version of the device. There are a number of ways in which the processor could determine whether the application is written for the new device or for a legacy device. One way would be if all applications written for the new device reported information to the processor upon loading that identified the application as being written for the new device. The reporting of such information would identify the application as having been written for the new device and failure to report such information would identify the application as a legacy application.

The information returned by the processor to the requesting application 101 would vary based on whether the application 101 is a legacy application or a new application, i.e., one written to run on the device. If the requesting application 101 is a new application, the processor returns true processor information, e.g., the correct processor ID 103 for the processor on the device running the application, as indicated at 106. If the requesting application 101 is a legacy application, the processor returns spoofed processor information, e.g., a spoofed processor ID 105, as indicated at 108. The returned information may identify certain features that are in fact supported by the processor as not being supported, or specify that the processor running the application is a legacy processor.

By way of example and not by way of limitation, the spoofed processor ID 105 may be returned by a modified CPUID instruction, which is an opcode supported by the x86 architecture. By using the CPUID opcode, software can determine processor type and the presence of features such as implementation of the various SSE instruction set architectures. On the x86 architecture the CPUID opcode is the bytes 0Fh and A2h and the value in the EAX register, and in some cases the ECX register, specifies what information to return.

In assembly language the CPUID instruction takes no parameters and instead implicitly uses the EAX register to determine the main category of information returned, which is commonly called the CPUID leaf. An application calling CPUID with EAX=0 will receive in the EAX register the highest EAX calling parameter (leaf) that the CPU supports in return, and other registers contain a vendor ID that identifies the CPU manufacturer. To obtain extended function information CPUID may be called with the most significant bit of EAX set. To determine the highest extended function calling parameter, CPUID may be called with EAX=80000000h. Some leaves also have sub-leaves, which are selected via the ECX register before calling CPUID.

Calling CPUID with EAX=1 returns information on the CPU's stepping model, model, and family information in EAX (also called the signature of a CPU), feature flags in EDX and ECX, and additional feature info in EBX. Calling CPUID with EAX=2 returns a list of descriptors indicating cache and translation lookaside buffer (TLB) capabilities in EAX, EBX, ECX and EDX registers. Other EAX values return information such as processor serial number, thread/core and cache topology, extended features, processor brand, L1 cache and TLB identifiers, extended L2 cache features, power management feature identifiers, and virtual and physical address sizes. A program of the type shown in FIG. 1 may return values that are different for the correct values of any or all of these if queried by a legacy application.

CPU

Figure 2:
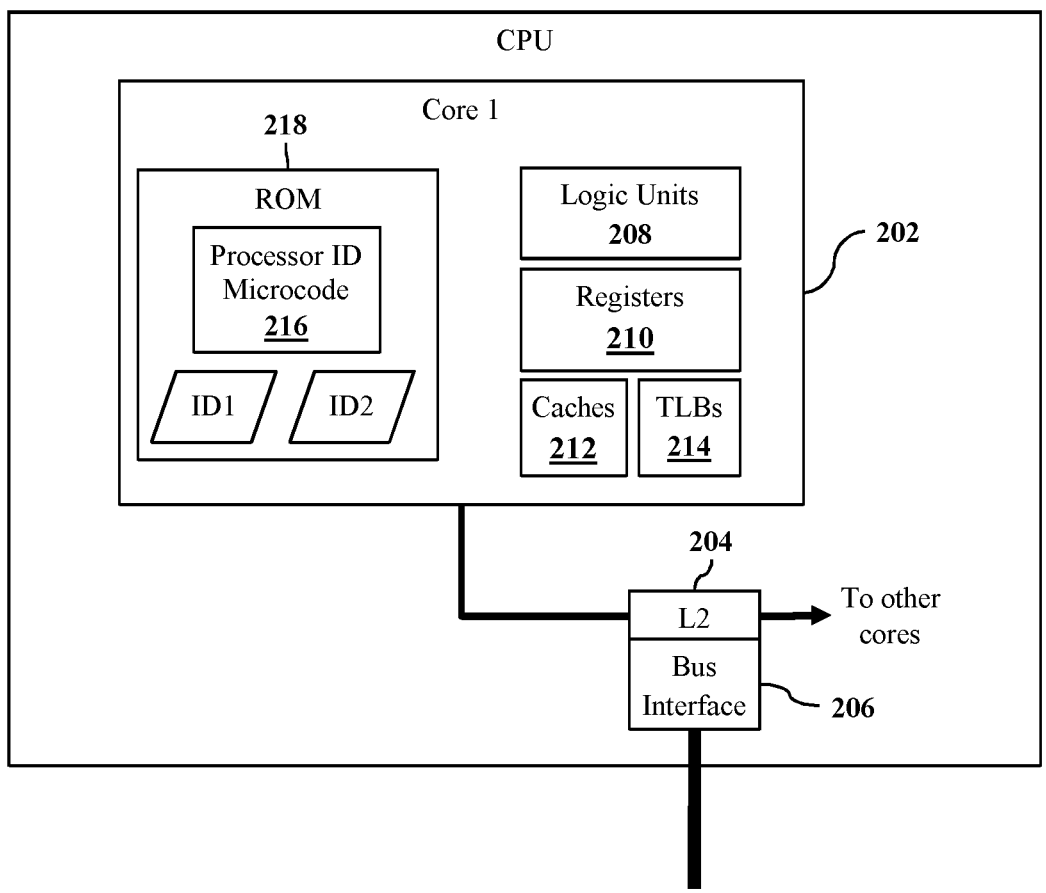
FIG. 2 is a block diagram depicting a central processing unit (CPU) in which executable software for carrying out the method of FIG. 1 is implemented in Read-Only Memory (ROM).

The processor ID spoofing capability shown in FIG. 1 can be implemented on a new device in any of a number of different ways. For example, a new device may include special microcode in ROM or RAM that returns the spoofed processor ID information in response to a query from a legacy application. FIG. 2 illustrates one possible implementation of a CPU 200 in which the microcode is implemented in a ROM that is part of a CPU core 202. The CPU may include one or more such cores. The CPU cores 202 may share a common level 2 cache 204 and bus interface 206. Each core 202 may contain logic units 208 for loading, storing, scheduling, decoding, and executing instructions along with registers 210, caches 212, and translation lookaside buffers (TLBs) 214 for instructions and data.

In the particular implementation shown in FIG. 2, the CPUID instruction is implemented by microcode 216 stored in a ROM 218 that contains a processor ID program and two different sets of processor ID data. One set of data (ID1) is for new device applications and the other set (ID2) is for legacy device applications.

In alternative implementations there may be two different processor ID programs, one for legacy applications and one for new device application. In such implementations, the CPU 200 may selectively run one program or the other when executing the CPUID instruction depending on whether the application it is running is a legacy application or a new device application. In other alternative implementations, the processor ID program may be implemented by special dedicated hardware, e.g., certain aspects of returning the processor ID information may be implemented by hardware logic rather than microcode stored in ROM 218. In other alternative implementations, the microcode may be stored in Random Access Memory (RAM) rather than in ROM.

System

Figure 3:
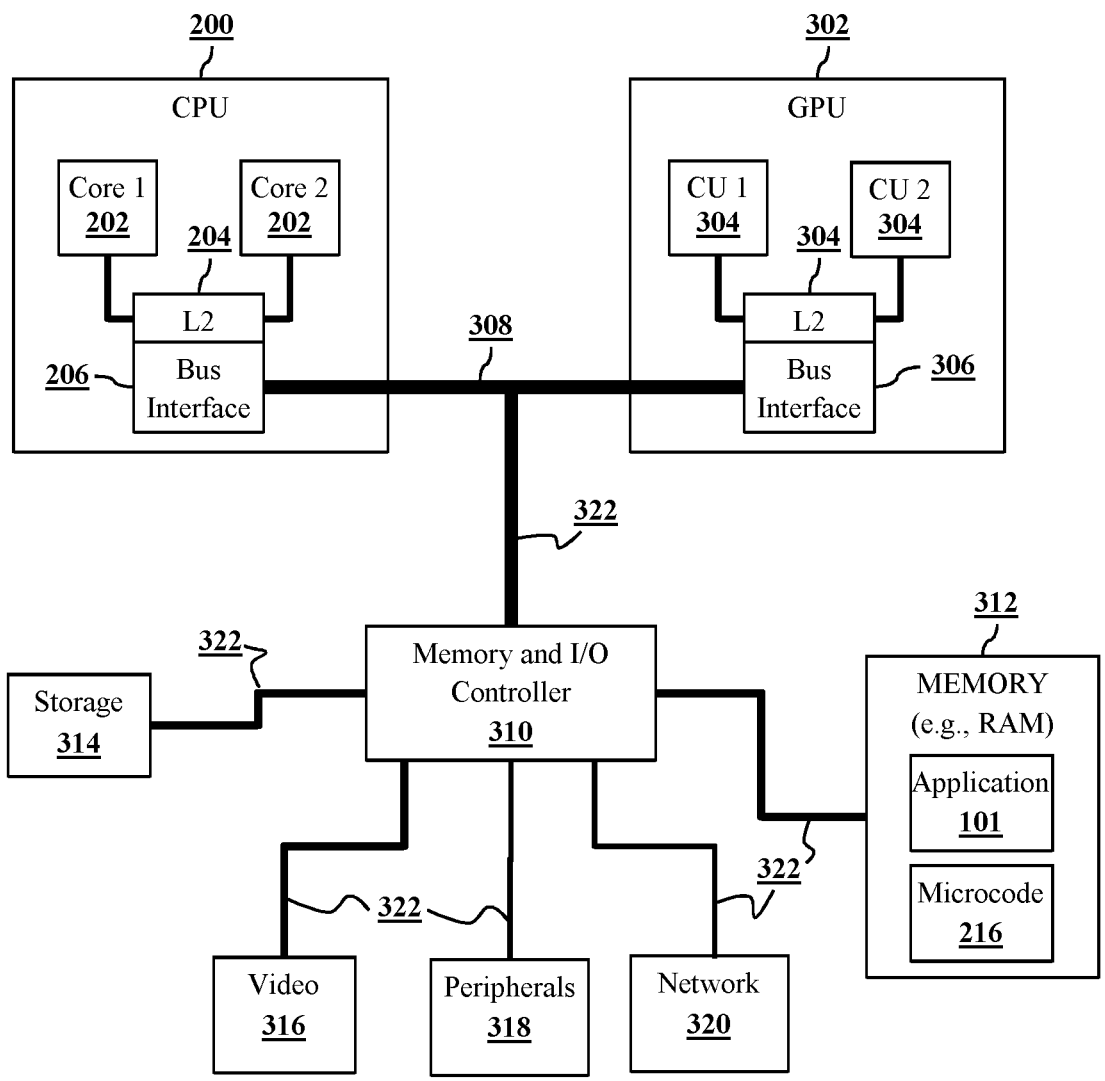
FIG. 3 is a block diagram of a device that includes a CPU of the type shown in FIG. 2.

A CPU of the type shown in FIG. 2 may be incorporated into a new device. As seen in FIG. 3, the new device 300 may include a CPU 200 with multiple cores 202 and a GPU 302 with multiple compute units (CUs) 304. The CPU and GPU may communicate with each other and with a memory and I/O controller 310 through L2 caches 204, 304, bus interfaces 206, 306 and a frontside bus 308. The memory and I/O controller 310 manages data transfers to and from the CPU 200 and GPU 302 and a memory 312 (e.g., RAM), storage devices 314 (e.g., disk drives or flash memory), video cards 316, peripherals 318, and a network 320 via appropriately configured busses 322.

The device 300 runs the application 101 by executing its instructions on the CPU 200 and GPU 302. Portions of the application 101 may be loaded into memory 312. In one particular implementation, the CPUID instruction is implemented by microcode that contains a processor ID program and two different sets of processor ID data, e.g., as discussed above with respect to FIG. 2.

As noted above, in alternative implementations there may be two different processor ID programs, one for legacy applications and one for new device application. In such implementations, the CPU 200 may selectively run one program or the other when executing the CPUID instruction depending on whether the application it is running is a legacy application or a new device application. In other alternative implementations, a single processor ID program may return processor ID data that differs in some specifics depending on whether the querying program is a legacy application or a new device application. In other alternative implementations, the processor ID code 216 may be implemented by special dedicated hardware, e.g., certain aspects of returning the processor ID information may be implemented by hardware logic rather than microcode stored in a ROM 218 of a CPU core 202. In other alternative implementations, the microcode may be stored in Random Access Memory (RAM), e.g., main memory 312 rather than in ROM.

Returning spoofed processor feature information can facilitate resolution of backward compatibility issues by preventing an application from taking advantage of features that, even though they are supported, might cause timing issues if a legacy application attempts to use them.

While the above is a complete description of the preferred embodiments of the present invention, it is possible to use various alternatives, modifications, and equivalents. Therefore, the scope of the present invention should be determined not with reference to the above description but should, instead, be determined with reference to the appended claims, along with their full scope of equivalents. Any feature, whether preferred or not, may be combined with any other feature, whether preferred or not. In the claims that follow, the indefinite article "A" or "An" refers to a quantity of one or more of the item following the article, except where expressly stated otherwise. The appended claims are not to be interpreted as including means-plus-function limitations, unless such a limitation is explicitly recited in a given claim using the phrase "means for". Any element in a claim that does not explicitly state "means for" performing a specified function, is not to be interpreted as a "means" or "step" clause as specified in 35 USC § 112(f).

The invention claimed is:

1. A method, comprising:
  in a computing device, responding to a call from an application for information regarding a processor on the computing device by returning information regarding a different processor than the processor on the computing device wherein responding to a call from the application includes use of microcode stored on a memory in a core of the processor, wherein the microcode returns processor ID data including at least one of processor model, processor family, cache capabilities, translation lookaside buffer capabilities, processor serial number, processor brand, processor manufacturer, thread/core topology, cache topology, extended features, virtual address size, or physical address size that differs depending on whether the processor determines that the application is a new device application or a legacy device application.

2. The method of claim 1, wherein the information regarding the different processor identifies certain features of the processor on the computing device as being different from ones that are actually supported by the computing device.

3. The method of claim 1, wherein the information regarding the different processor identifies certain features of the processor on the computing device as not being supported at all by the processor on the computing device when in fact the certain features are supported by the processor on the computing device.

4. The method of claim 1, wherein the application is a legacy application written for a legacy computing device.

5. The method of claim 1, wherein the application is a legacy application written for a legacy computing device and wherein the information regarding the different processor identifies certain features of the processor on the computing device as being different from ones that are actually supported by the computing device.

6. The method of claim 1, wherein the application is a legacy application written for a legacy computing device and wherein the information regarding the different processor identifies certain features of the processor on the computing device as not being supported at all by the processor on the computing device when in fact the certain features are supported by the processor on the computing device.

7. The method of claim 1, wherein the application is a legacy application written for a legacy computing device and wherein the information regarding the different processor identifies a processor on the legacy computing device.

8. The method of claim 1, wherein returning the information regarding the different processor includes use of an opcode supported by an architecture of the processor on the computing device.

9. The method of claim 1, wherein returning the information regarding the different processor includes use of an opcode supported by an x86 architecture.

10. The method of claim 1, wherein returning the information regarding the different processor includes use of a CPUID instruction.

11. The method of claim 1, wherein returning the information regarding the different processor includes use of a microcode stored in a ROM in the core of the processor on the computing device and two different sets of processor ID data, wherein one set of data is for new device applications and another set of data is for legacy device applications.

12. The method of claim 1, wherein returning the information regarding the different processor includes use of one ID program for legacy applications and another ID program for new device applications.

13. The method of claim 1, wherein returning the information regarding the different processor includes use of dedicated hardware.

14. A computing device, comprising:
a processor configured to respond to a call from an application for information regarding the processor by returning information regarding a different processor wherein responding to a call from the application includes use of microcode stored on a memory in a core of the processor, wherein the microcode returns processor ID data including at least one of processor model, processor family, cache capabilities, translation lookaside buffer capabilities, processor serial number, processor brand, processor manufacturer, thread/core topology, cache topology, extended features, virtual address size, or physical address size that differs depending on whether the processor determines that the application is a new device application or a legacy device application.

15. The computing device of claim 14, wherein the information regarding the different processor identifies certain features of the processor on the computing device as being different from ones that are actually supported by the computing device.

16. The computing device of claim 14, wherein the information regarding the different processor identifies certain features of the processor on the computing device as not being supported at all by the processor on the computing device when in fact the certain features are supported by the processor on the computing device.

17. The computing device of claim 14, wherein the application is a legacy application written for a legacy computing device.

18. The computing device of claim 14, wherein the application is a legacy application written for a legacy computing device and wherein the information regarding the different processor identifies certain features of the processor on the computing device as being different from ones that are actually supported by the computing device.

19. The computing device of claim 14, wherein the application is a legacy application written for a legacy computing device and wherein the information regarding the different processor identifies certain features of the processor on the computing device as not being supported at all by the processor on the computing device when in fact the certain features are supported by the processor on the computing device.

20. The computing device of claim 14, wherein the application is a legacy application written for a legacy computing device and wherein the information regarding the different processor identifies a processor on the legacy computing device.

21. The computing device of claim 14, wherein returning the information regarding the different processor includes use of an opcode supported by an architecture of the processor on the computing device.

22. The computing device of claim 14, wherein returning the information regarding the different processor includes use of an opcode supported by an x86 architecture.

23. The computing device of claim 14, wherein returning the information regarding the different processor includes use of a CPUID instruction.

24. The computing device of claim 14, wherein returning the information regarding the different processor includes use of a microcode stored in a ROM in the core of the processor on the computing device and two different sets of processor ID data, wherein one set of data is for new device applications and another set of data is for legacy device applications.

25. The computing device of claim 14, wherein returning the information regarding the different processor includes use of one ID program for legacy applications and another ID program for new device applications.

26. The computing device of claim 14, further comprising dedicated hardware configured to return the information regarding the different processor includes use of dedicated hardware.

27. A non-transitory computer-readable medium having embodied therein executable instructions configured to cause a computing device to respond to a call from an application for information regarding a processor on a computing device by returning information regarding a different processor than the processor on the computing device when executed wherein responding to a call from the application includes use of microcode stored on a memory in a core of the processor, wherein the microcode returns processor ID data including at least one of processor model, processor family, cache capabilities, translation lookaside buffer capabilities, processor serial number, processor brand, processor manufacturer, thread/core topology, cache topology, extended features, virtual address size, or physical address size that differs depending on whether the processor determines that the application is a new device application or a legacy device application.

28. The non-transitory computer-readable medium of claim 27, wherein the information regarding the different processor identifies certain features of the processor on the computing device as being different from ones that are actually supported by the computing device.

29. The non-transitory computer-readable medium of claim 27, wherein the information regarding the different processor identifies certain features of the processor on the computing device as not being supported at all by the processor on the computing device when in fact the certain features are supported by the processor on the computing device.

30. The non-transitory computer-readable medium of claim 27, wherein the application is a legacy application written for a legacy computing device.

31. The non-transitory computer-readable medium of claim 27, wherein the application is a legacy application written for a legacy computing device and wherein the information regarding the different processor identifies certain features of the processor on the computing device as being different from ones that are actually supported by the computing device.

32. The non-transitory computer-readable medium of claim 27, wherein the application is a legacy application written for a legacy computing device and wherein the information regarding the different processor identifies certain features of the processor on the computing device as not being supported at all by the processor on the computing device when in fact the certain features are supported by the processor on the computing device.

33. The non-transitory computer-readable medium of claim 27, wherein the application is a legacy application written for a legacy computing device and wherein the information regarding the different processor identifies a processor on the legacy computing device.

34. The non-transitory computer-readable medium of claim 27, wherein returning the information regarding the different processor includes use of an opcode supported by an architecture of the processor on the computing device.

35. The non-transitory computer-readable medium of claim 27, wherein returning the information regarding the different processor includes use of an opcode supported by an x86 architecture.

36. The non-transitory computer-readable medium of claim 27, wherein returning the information regarding the different processor includes use of a CPUID instruction.

37. The non-transitory computer-readable medium of claim 27, wherein returning the information regarding the different processor includes use of a microcode stored in a ROM in the core of the processor on the computing device and two different sets of processor ID data, wherein one set of data is for new device applications and another set of data is for legacy device applications.

38. The non-transitory computer-readable medium of claim 27, wherein returning the information regarding the different processor includes use of one ID program for legacy applications and another ID program for new device applications.

39. The non-transitory computer-readable medium of claim 27, wherein returning the information regarding the different processor includes use of dedicated hardware.

* * * * *